United States Patent [19]

Hou

[11] Patent Number: 4,987,787
[45] Date of Patent: Jan. 29, 1991

[54] TRANSMISSION MECHANISM FOR MUSIC BOX ORNAMENT

[76] Inventor: Jack Hou, P.O. Box 78-95, Taipei, Taiwan

[21] Appl. No.: 475,984

[22] Filed: Feb. 6, 1990

Related U.S. Application Data

[63] Continuation of Ser. No. 204,507, Jun. 9, 1988.

[51] Int. Cl.⁵ .............................................. A63H 5/00
[52] U.S. Cl. .......................................... 74/49; 74/50; 272/31 R; 446/330
[58] Field of Search ................... 74/49, 50; 272/28 R, 272/28 S, 31 R; 403/70, 71, 76, 131; 446/91, 118, 330, 352

[56] References Cited

U.S. PATENT DOCUMENTS

| | | | |
|---|---|---|---|
| 1,272,568 | 7/1918 | Swan et al. | 74/50 |
| 2,301,967 | 11/1942 | Nosker et al. | 74/50 |
| 2,391,435 | 12/1945 | Melzer | 74/50 |
| 2,404,470 | 7/1946 | Zemen | 74/50 |
| 2,598,951 | 6/1952 | Weigele | 74/50 |
| 2,622,445 | 12/1952 | Benedict | 74/50 |
| 3,584,172 | 6/1971 | Owen | 74/50 |
| 4,289,040 | 9/1981 | Haluko, Jr. | 74/50 |
| 4,804,348 | 2/1989 | Bondi | 446/352 |

Primary Examiner—Leslie A. Braun
Assistant Examiner—Scott Anchell
Attorney, Agent, or Firm—Bacon & Thomas

[57] ABSTRACT

A mechanism for transmitting the power output of a music box to an ornament supported thereon, wherein the output shaft of the music box rotates an eccentric stub that is engaged within a slide link supported for vertical movement on a pair of guide rods. The ornament is supported by a tappet rod having a lower end secured to either the slide link or the drive stub, so that operation of the music box will impart the desired movement to the ornament.

1 Claim, 5 Drawing Sheets

TRANSMISSION MECHANISM FOR MUSIC BOX ORNAMENT

This application is a continuation of application Ser. No. 204,507, filed Jun. 9, 1988.

BACKGROUND OF THE INVENTION

1. Field of the Invention

The present invention generally involves the field of technology pertaining to animated toys and ornaments operated by a power drive source. More particularly, the invention relates to an improved mechanism for transmitting the power output from a drive source to an ornament for imparting a desired movement to the ornament.

2. Description of the Prior Art

It is well known to provide an animated device of the type wherein an ornament of a given configuration is supported for movement imparted by the power output of a music box. The ornament may be moved as a whole or be provided with appendages which are individually moved to impart a sense of realism consistent with the nature of the ornament. In order to realize such movement, the power output of the music box must be transmitted to the ornament through an appropriate drive mechanism which usually includes some form of gearing arrangement and associated movable linkages. For proper operation of the device, the transmission must ideally be capable of supporting and moving ornaments of different sizes and weights, be capable of reliable and prolonged operation, and be able to impart a desired movement to the ornament, particularly when such movement is intended to simulate the natural movement of the ornament figure.

SUMMARY OF THE INVENTION

It is an object of the invention to provide an improved transmission mechanism for a power driven ornament.

It is another object of the invention to provide an improved transmission mechanism for a music box which is capable of reliably imparting a desired movement to ornaments of different sizes and weights.

It is a further object of the invention to provide an improved transmission mechanism for imparting realistic movement to an ornament so that the natural movement of the ornament figure may be accurately simulated.

It is yet another object of the invention to provide an improved mechanism for transmitting the power output of an appropriate power source, such as a music box, to a movable ornament wherein the mechanism is extremely simple in construction, economical to manufacture and has longevity in operation.

These and other objects of the invention are realized by providing a transmission mechanism which is essentially defined by an elongate slide link provided with a central longitudinal slot and a pair of opposed holes therethrough at opposite ends of the link. The link is supported for slidable movement on a pair of guide rods which are received through the holes. The link is driven by the power output shaft of an appropriate power drive source, such as a wind-up music box, through a drive stub eccentrically mounted on a wheel rotated by the output shaft of the drive source. The stub is engaged within the slot of the link, thereby imparting reciprocating movement to the link during rotation of the wheel. This movement is transmitted to the ornament by a tappet rod journalled for sliding movement through a casing enclosing the transmission mechanism and drive source. An end of the tappet rod disposed within the casing may be secured to either the link or the drive stub. A spring may be disposed on each guide rod below the link for engagement thereby to bias the link and assist the drive source in imparting movement to the ornament.

In a first embodiment, the tappet rod is secured to the slide link to impart reciprocating movement to the ornament. In a second embodiment, the tappet rod is secured to the drive stub and journalled through the casing by a ball joint assembly, thereby simultaneously imparting both vertical and rocking movements to the ornament.

Other objects, features and advantages of the invention shall become apparent from the following detailed description of preferred embodiments thereof, when taken in conjunction with the drawings wherein like referenced characters refer to corresponding parts in the several views.

DETAILED DESCRIPTION OF THE PREFERRED EMBODIMENTS

Figure 1:
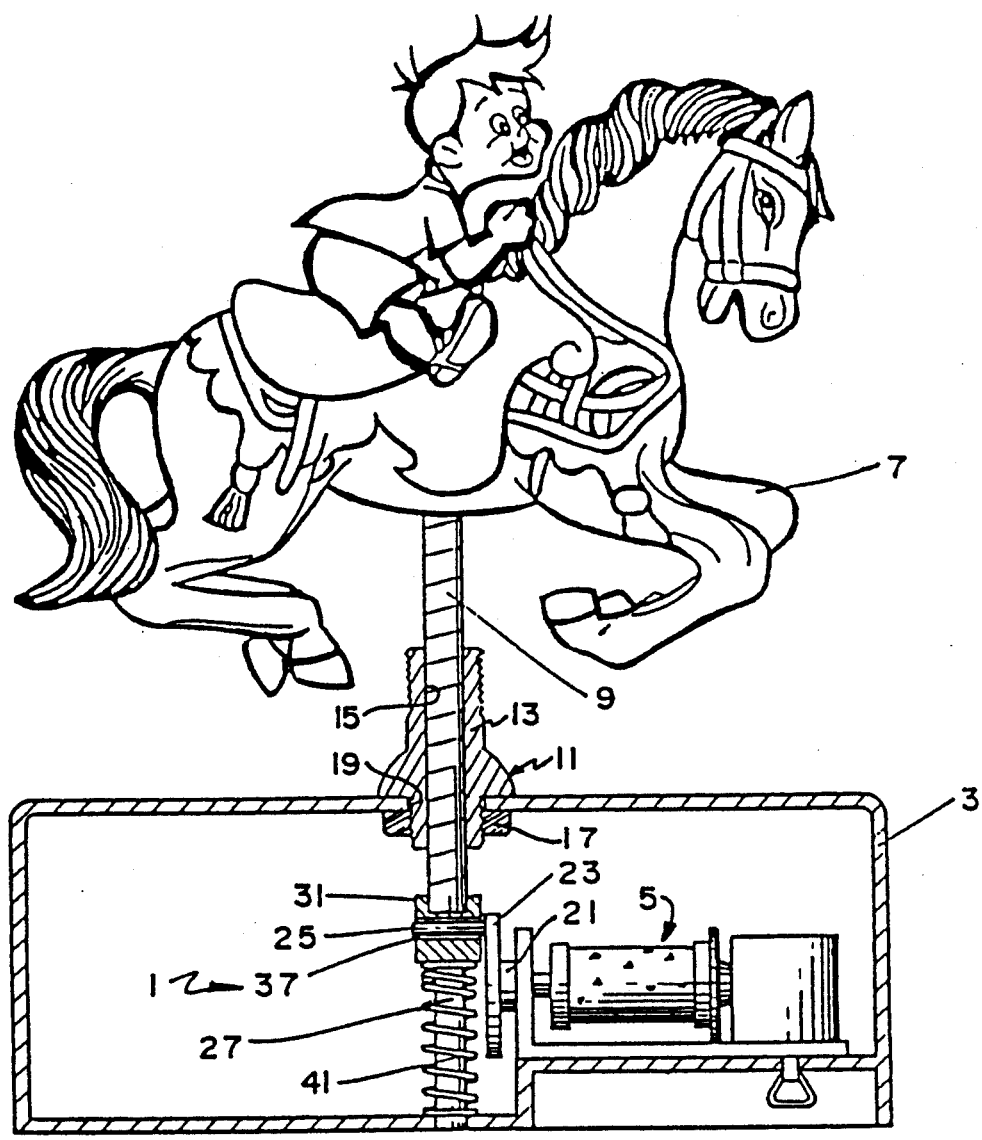
FIG. 1 is a front elevational view, partly in section, showing a transmission mechanism in accordance with a first embodiment of the invention for transmitting the power output of a windup music box to an ornament.
Figures 2A, 2B:
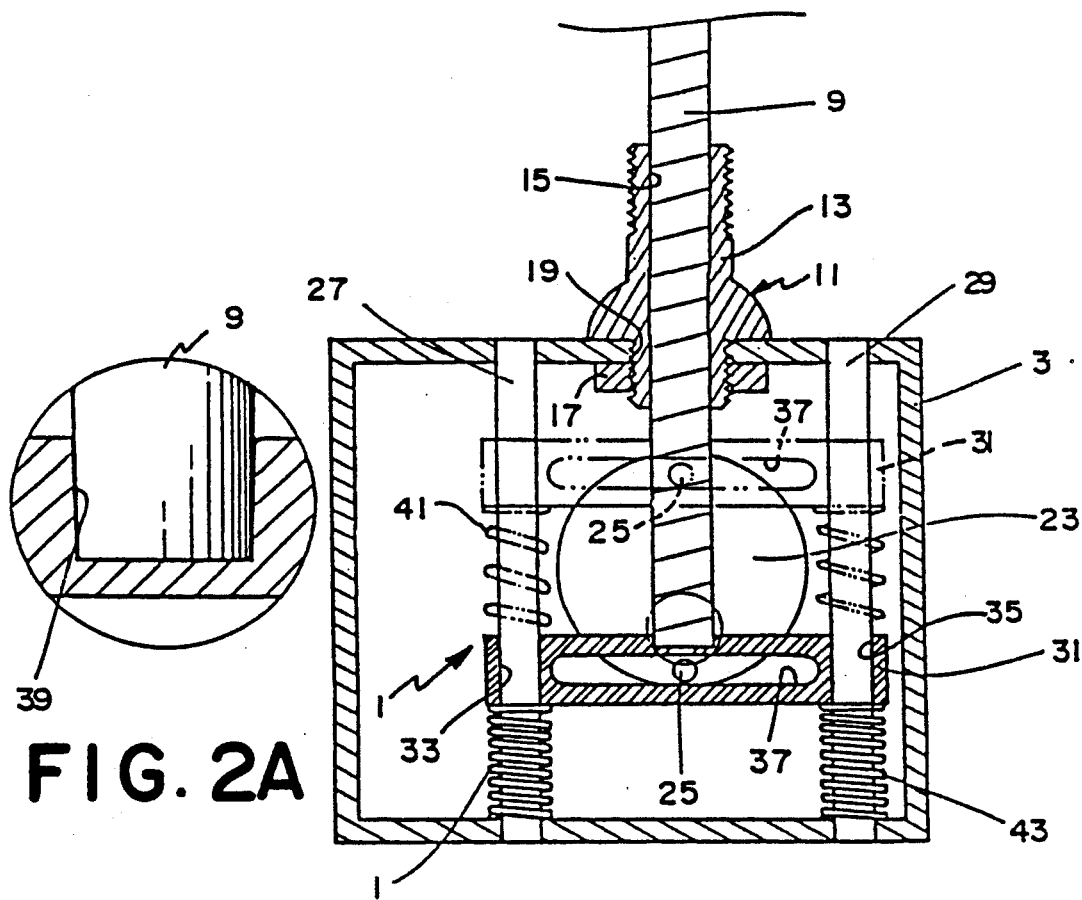
FIGS. 2A and 2B are a partial sectional view taken from the lefthand side of FIG. 1 and depicting the details of the transmission mechanism, with the slide link being shown in upper and lower positions.

A transmission mechanism 1, according to a first embodiment of the invention shall be described with initial reference to FIGS. 1 and 2. As seen therein, mechanism 1 is disposed within a casing 3 and is driven by an appropriate power drive source 5, such as a conventional wind-up music box. An ornament 7 is connected to mechanism 1 by a tappet rod 9 which is journalled for slidable movement through casing 3 by an appropriate bushing assembly 11 consisting of a threaded stem 13 provided with a longitudinal channel 15 therethrough for slidably receiving rod 9 and a lock nut 17 for securing sleeve 13 to casing 3 through an aperture 19 formed therein. Ornament 7 is supported on the end of rod 9 extending outwardly of casing 3, with the other end of rod 9 disposed within casing 3 being secured directly to mechanism 1.

A power output shaft 21 of drive source 5 is joined at its end to the center of a drive wheel 23 for rotating same during operation of drive source 5. Wheel 23 is provided with an elongate drive stub 25 which is eccentrically positioned with respect to the axis of rotation of shaft 21 and extends outwardly of wheel 23.

As more clearly shown in FIG. 2, transmission mechanism 1 is essentially defined by a pair of parallel guide rods 27 and 29, preferably of identical cylindrical configuration and size, which are rigidly secured at their opposite ends within opposed wall portions of casing 3. An elongate slide link 31 of rectangular configuration is slidably supported on guide rods 27 and 29 by disposing rods 27 and 29 through a pair of corresponding holes 33 and 35 formed through the opposite ends of link 31. As also shown in FIG. 2, link 31 is provided with a longitudinal slot 37 within which drive stub 25 is disposed for reciprocating movement therein. As also shown in the enlarged section A of FIG. 2, the end of tappet rod 9 disposed within casing 3 is secured directly within a correspondingly shaped recess 39 formed within link 31 and disposed approximately midway between guide rods 27 and 29. It is preferred that recess 39 be of a slightly conical configuration and that the end of rod 9 disposed therein be of a corresponding configuration to facilitate insertion and securement.

Transmission mechanism 1 may also be provided with a pair of coil springs 41 and 43 disposed on guide rods 27 and 29, respectively, and positioned below slide link 31 for engagement thereby. As apparent from FIG. 2, when slide link 31 is in its lowermost position, which position corresponds to the bottom dead center of drive stub 25, springs 41 and 43 are in a compressed state. Likewise, when link 31 is in its uppermost position, which position corresponds to the top dead center of drive stub 25, coil springs 41 and 43 are in an expanded state. Springs 41 and 43 serve the purpose of providing additional support and bias to slide link 31 to permit smooth operation of mechanism 1 when larger or heavier ornaments 7 are used.

The operation of mechanism 1 is clearly apparent from FIGS. 1 and 2. When power drive source 5 is activated, rotation of output shaft 21 imparts corresponding rotation to wheel 23. This in turn causes drive stub 25 to slidably reciprocate within slot 37 and engage against the opposite sides thereof, thereby causing link 31 to slide up and down on guide rods 27 and 29. Accordingly, a corresponding vertical reciprocating movement is imparted to tappet rod 9 and ornament 7 supported thereon. In this embodiment, ornament 7 is in the configuration of a horse which, when movement is imparted thereto by mechanism 1, appears to be galloping.

A transmission mechanism 45 according to a second embodiment of the invention shall now be described with reference to FIGS. 3–7. As particularly shown in FIGS. 3–5, a pair of mechanisms 45 are used to transmit the power output from a common power drive source 47 to an ornament assembly 48 that includes a pair of corresponding ornaments 49 in the form of horses that are connected together for joint movement by a tie rod unit 51 of T-shaped configuration. As more clearly shown in FIGS. 3 and 4, tie rod unit 51 also connects a third ornament 53, in the form of a chariot having a pair of wheels 54, to ornaments 49 for joint movement therewith, and in a manner to be later described.

Both transmission mechanisms 45 and power drive source 47 are disposed and supported within a casing 55. As particularly seen in FIG. 5, drive source 47, which may be a music box, electric motor or the like, is provided with a pair of opposed power output shafts 57, with the end of each shaft 57 being connected to the center of a drive wheel 59 for rotating same during operation of drive source 47. As in the case of the first embodiment, each wheel 59 includes an outwardly extending and eccentrically disposed drive stub 61 which is received within a longitudinal slot 63 of an elongate slide link 65. Links 65 are each supported for vertical movement on a pair of parallel guide rods 67, with each rod 67 being rigidly secured at its opposite ends to opposed wall portions of casing 55. Each guide rod 67 may also be provided with a coil spring 69 positioned below slide link 65 and operable in the same manner previously described for the first embodiment.

Figure 6:
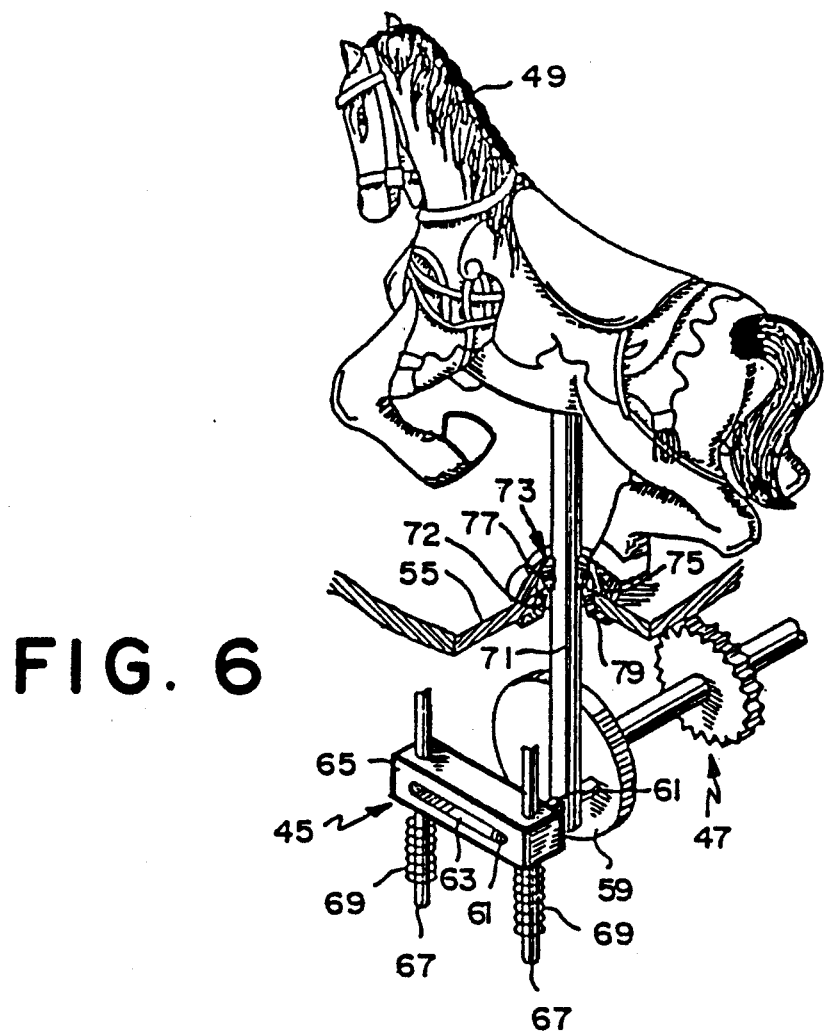
FIG. 6 is a perspective view, partly in section, depicting a single transmission mechanism of the second embodiment.

The imparting of movement to each ornament 49 by its corresponding transmission mechanism 45 shall now be described with reference to FIG. 6. A tappet rod 71 having one end extending outwardly of casing 55 is secured to ornament 49. The other end of rod 71 is disposed within casing 55 and is provided with an aperture through which stub shaft 61 is rotatably disposed. Rod 71 is also journalled through an aperture 72 in casing 55 by a ball joint assembly 73 which includes a socket portion 75 containing a ball segment 77 therein and a bushing 79 for securing socket 75 and ball segment 77 to casing 55. Ball segment 77 is provided with a central channel configured for slidably receiving rod 71 therethrough. It is preferred that busing 79 be secured to socket 75 through a threaded engagement therewith. By virtue of assembly 73, it is apparent that rod 71 of each mechanism 45 shall be permitted both sliding and pivoting movements with respect to assembly 73.

Figure 3:
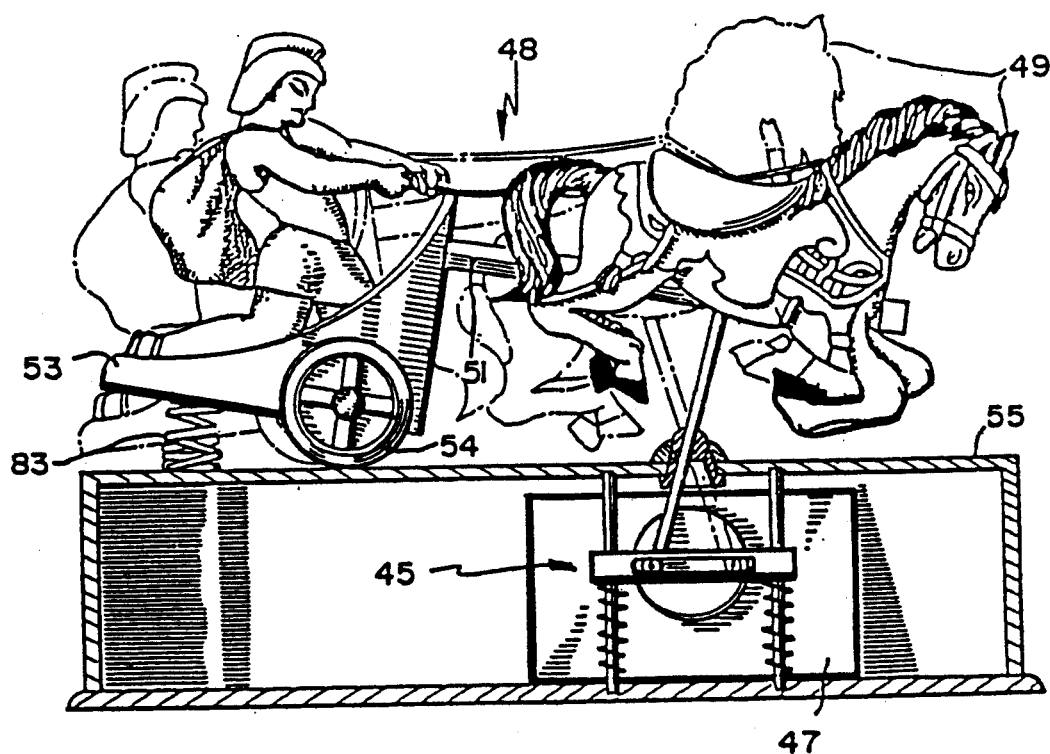
FIG. 3 is a front elevational view, partly in section, showing a dual transmission mechanism according to a second embodiment of the invention wherein the mechanism is used to simulate the natural movement of an ornament assembly in the form of a horse-drawn chariot, with the mechanism depicting the manner in which rocking movement is imparted to the assembly.
Figure 4:
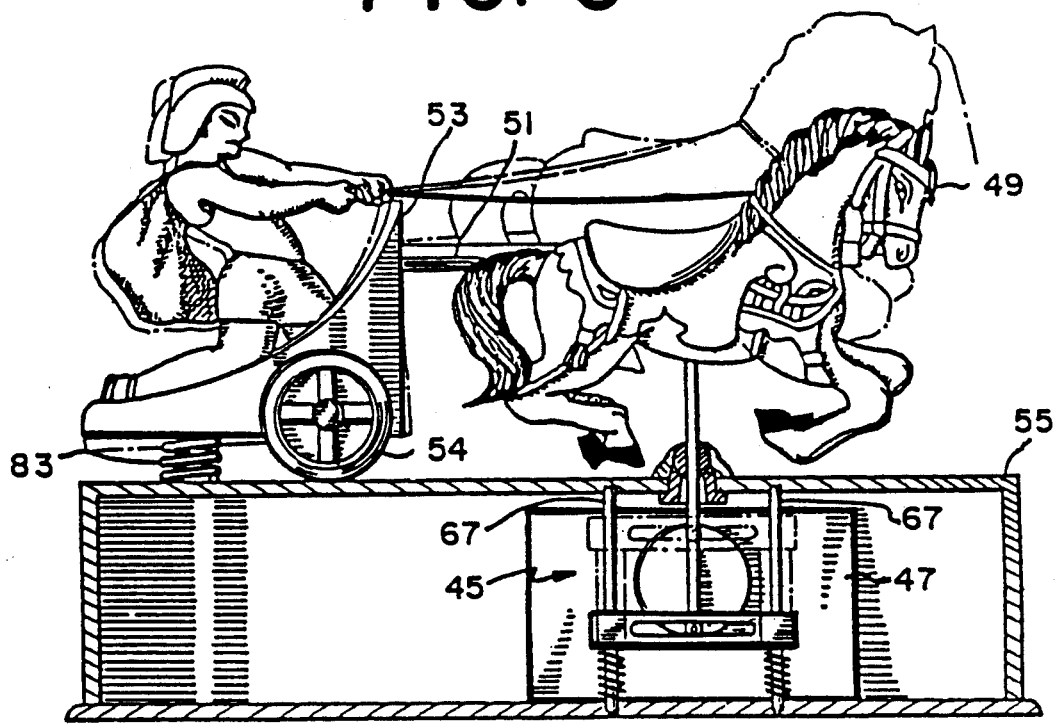
FIG. 4 is similar in view to the mechanism shown in FIG. 3 but depicting the manner in which vertical movement is imparted to the ornament assembly.
Figure 5:
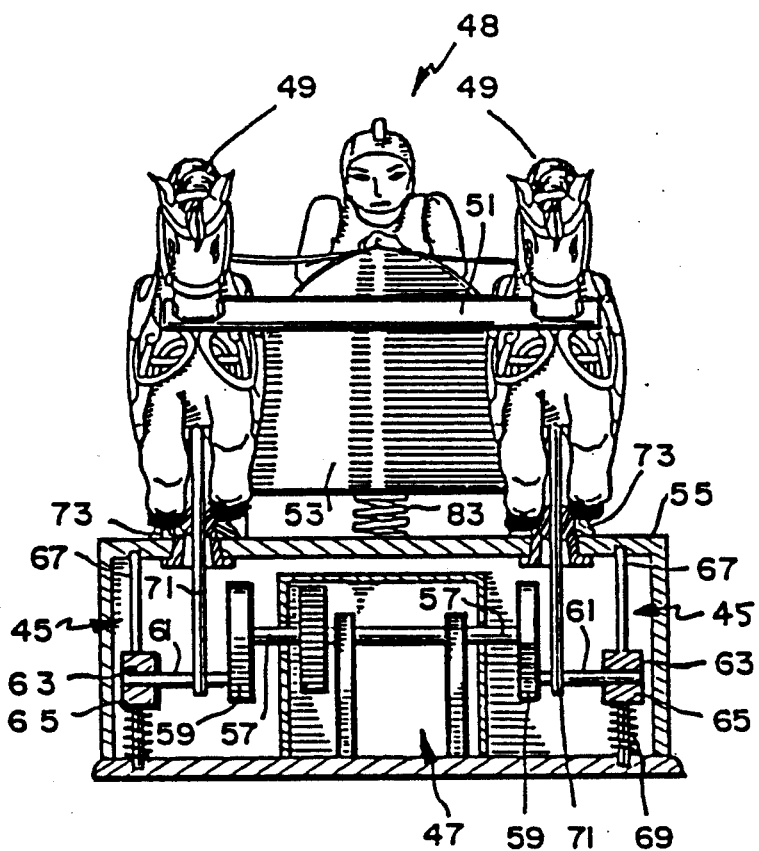
FIG. 5 is a view, partly in section, taken from the righthand side of FIG. 4.

The operation of the second embodiment shall now be described with particular reference to FIGS. 3–5. Operation of power drive source 47 rotates power output shafts 57, which in turn serve to rotate their corresponding drive wheels 59. This causes eccentrically mounted drive stub 61 of each wheel 59 to reciprocate within and engage the opposite sides of slot 63 of its corresponding slide link 65, resulting in a vertical reciprocating movement of slide link 65 under and against the bias imparted by springs 69. Because the end of each tappet rod 71 is rotatably joined directly to its corresponding drive stub 61, both a pivotal movement, as shown in FIG. 3, and a vertical movement, as shown in FIG. 4, are simultaneously imparted to rod 71 and transmitted to its associated ornament 49. In this embodiment, ornaments 49 are each configured as a horse and ornament 53 is configured as a driver-controlled chariot, with ornaments 49 and 53 being joined by tie rod unit 51 for joint movement. A coil spring 83 is provided to join ornament 53 to casing 55 so that the natural galloping movement of ornaments 49 will create corresponding realistic movement of ornament 53 under the bias of spring 83. The overall movement is in the form of a galloping rhythm, wherein there is simultaneously produced both forward and backward motion and upward and downward motion, with wheels 54 of ornament 53 engaging casing 55 and serving as a fulcrum point to permit ornament 53 to move in an arc-shaped rocking motion.

Figures 7A, 7B:
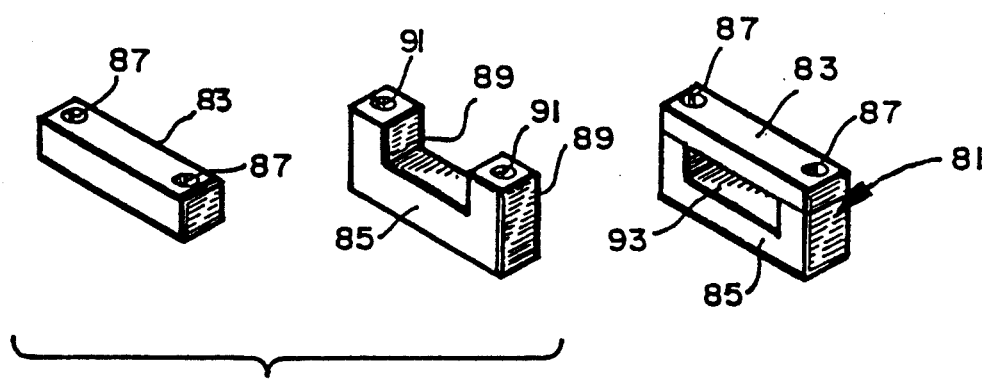
FIGS. 7A and 7B are a perspective view showing a manner in which the slide link may be formed.

With reference to FIG. 7, there is shown a manner in which a slide link 81 may be formed for use in the practice of the invention. Link 81 is formed from an elongate member 83 and a U-shaped member 85. Member 83 is provided with a pair of holes 87 at its opposite ends, with each hole 87 being configured and sized to slidably receive a corresponding guide rod therethrough. Member 85 includes a pair of legs 89 provided with a pair of longitudinal passageways 91 which extend completely therethrough. Each passageway 91 correspond in configuration and size to holes 87 so that when members 83 and 85 are assembled in the manner shown, there is provided a completed link 81 provided with a longitudinal slot 93 therein and capable of being slidably mounted on two corresponding guide rods in the manner previously described. Alternatively, link 81 may be integrally formed and be of unitary construction. It is preferred that any slide link utilized in the practice of the invention be formed of plastic material, although any other material deemed appropriate for the practice of the invention as described herein may also be advantageously utilized.

Although a wind-up music box may be used as the power drive source for operating either embodiment of the invention, it is understood that other well known drive sources, such as electric motors, may also be used to advantage for performing the required function as described herein. In either case, appropriate gearing and speed reducers may be used to provide the desired operational speeds for the animation of different ornaments.

It is to be understood that the forms of the invention herein shown and described are to be taken as preferred embodiments thereof, and that various changes in shape, material, size and arrangement of parts may be resorted to without departing from the spirit of the invention or scope of the subjoined claims.

What is claimed is:

1. A mechanism for transmitting the power output of a power drive source to an ornament for imparting a desired movement thereto, which mechanism comprises:

(a) a casing defining an internal compartment and including a wall provided with an aperture therethrough;

(b) a wind-up music box including a rotary power output shaft extending outwardly therefrom, the music box being disposed within the internal compartment of the casing and being substantially fully enclosed thereby;

(c) a drive wheel carried by the power output shaft and directly rotated thereby, the drive wheel including an elongate drive stub extending outwardly from one side thereof, the longitudinal axis of the drive stub being positioned eccentrically with respect to the power output shaft axis of rotation and parallel thereto;

(d) a slide link including a longitudinal slot formed therein and a pair of spaced guide holes at opposite ends of the slide link, the drive stub being engaged within the longitudinal slot;

(e) guide means including a pair of stationary parallel guide rods, each guide rod being slidably received through a guide hole of the slide link;

(f) a bushing assembly including a threaded stem provided with a longitudinal channel therethrough and a lock nut, the threaded stem being disposed through the aperture in the wall of the casing and secured to the wall by the lock nut;

(g) a tappet rod journalled for sliding movement through the longitudinal channel of the threaded stem, the tappet rod including a first end disposed within the internal compartment of the casing and secured to the slide link, and a second end disposed exteriorly of the casing for mounting an ornament thereon; and (h) whereby when the drive wheel is rotated by the power output shaft of the wind-up music box, the slide link is caused to reciprocate vertically on the guide rods and impart a corresponding reciprocating movement to the tappet rod and ornament mounted thereon.

* * * * *